July 23, 1940.  A. T. DILDILIAN  2,209,247
METHOD OF SEAMING FLOOR COVERINGS
Filed Oct. 5, 1935
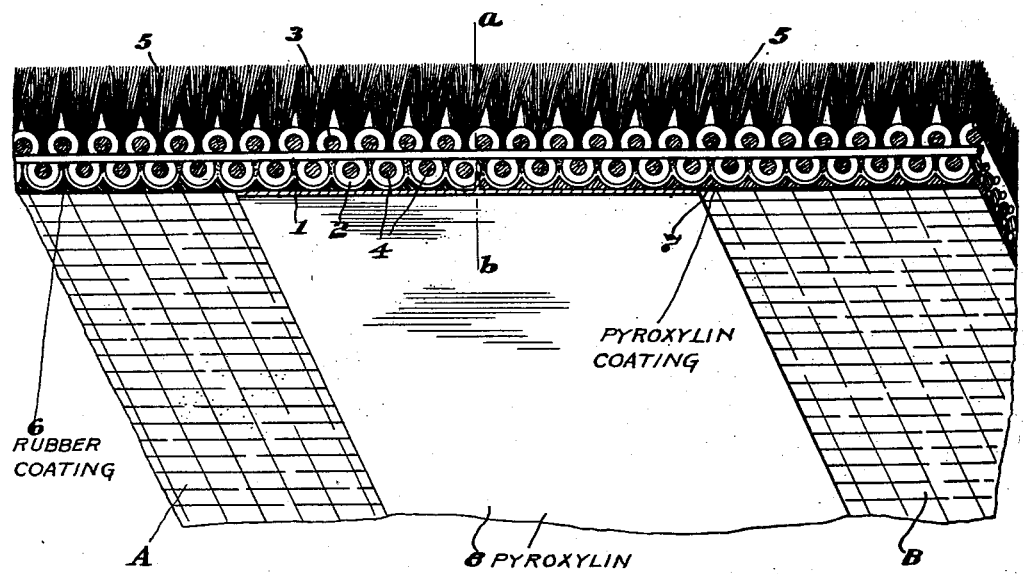
INVENTOR
Ara T. Dildilian
BY
ATTORNEY Patented July 23, 1940

2,209,247

UNITED STATES PATENT OFFICE 2,209,247

METHOD OF SEAMING FLOOR COVERINGS

Ara T. Dildilian, Suffield, Conn., assignor to Bigelow-Sanford Carpet Co., Inc., Thompsonville, Conn., a corporation of Massachusetts Application October 5, 1935, Serial No. 43,739

4 Claims. (Cl. 154—42)

This invention relates to a method of making floor coverings from strips of fabric and is more particularly concerned with securing together adjoining or abutting cut edges of the fabric strips without the appearance of a joining seam.

It has been proposed heretofore to obviate the use of the common sewed seam in connecting strips of fabric, by the use of an adhesive tape extending along the abutting edges of the fabric strips and securing them together,—the adhesive tape usually being formed of a woven fabric having one of its surfaces coated with an adhesive, but also frequently comprising merely a film of adhesive with or without reinforcing fabric or threads. The adhesive coating of such tapes, or the tape itself as the case may be, is usually conditioned or rendered tacky, prior to or during the application of the tape, either by the use of a suitable liquid to dissolve the adhesive chemically or soften it physically or by the application of heat if the adhesive be of a thermoplastic variety.

The fabric from which the rug strips to be joined are cut may comprise a woven fabric with or without a pile surface or it may be of an unwoven variety such, for example, as an artificial felt, composite pile fabric, or the like, and such fabrics are also frequently treated with an adhesive during the manufacture and prior to the cutting of the fabric into strips, which adhesive serves to hold together the component parts of the fabric (including the pile forming threads if the strips be of a pile fabric), and permits the fabric to be cut into strips on any line without ravelling of the yarns. Whether or not the fabric be of the woven variety, this adhesive medium is frequently formed as a coating on the fabric backing but, alternatively, may also be incorporated into the fabric structure during its construction. As typical of the latter method of applying adhesive in a woven fabric, for example, one or more threads may be employed in the weaving which can subsequently be treated with a solvent or with heat to produce an adhesive medium which flows internally of the rug structure and onto the exposed surface of the backing.

It is thus apparent that where fabric strips, provided with adhesives applied in any of the various ways above indicated, are to be joined together at abutting cut edges with an adhesive in tape form, a large number of different combinations of adhesives will be presented on the several elements to be joined and it is the primary object of the present invention to provide softening agents for such different combinations of adhesives which will cause the adhesives to combine with each other, either physically or chemically, whereby a firmer and more lasting joint between the cut edges is effected. Little difficulty is of course presented where the fabric strips to be joined are provided with a common adhesive which is also the adhesive medium employed in tape form to join the abutting cut edges of such fabric strips and in that event a single solvent or softening agent common to all three adhesives is employed. However, it is frequently desirable to employ as a joining tape adhesive, a substance differing substantially in chemical composition from the adhesives presented on the fabric strips to be united, which, in themselves, may differ in chemical or physical characteristics.

Different adhesives may have common solvents, producing either true solutions or colloidal dispersions of the adhesive, and where the rug strips to be joined present the same adhesive or different adhesives having a common solvent and where the tape used to join the abutting cut edges of such fabric strips itself presents an adhesive similar to one of the adhesives presented on the fabric strips or dissimilar to either but having a solvent which is common to the solvent for the adhesives on the fabric strips, I employ such a solvent, in the manner hereinafter described, on all three adhesives, thereby causing the three adhesives to go into solution or colloidal dispersion with each other, which solution or dispersion upon drying, effectively secures together the various elements to be joined. On the other hand, the fabric strips to be joined may have adhesives which have no common solvent and in that event my invention provides a different solvent for each adhesive, but a solvent of such a character that the dissimilar adhesives, when dissolved or colloidally dispersed in their respective solvents, are miscible with each other. The solvent employed on the adhesive of the joining tape may in that event also be either common to one of the solvents employed on the fabric strips to be joined or may comprise still a third solvent which produces a solution or colloidal dispersion of the tape adhesive which is miscible with the solution or dispersion of adhesives on the strips to be joined.

The liquids which I employ to render tacky the adhesives on one or a plurality of the elements to be joined, need not necessarily be solvents of the adhesive but may condition the adhesive for joining otherwise than by dissolving it or forming a colloidal dispersion, as for example, where rubber is employed as an adhesive, in which event a liquid softening agent which merely causes the rubber to swell is effective for the purpose. Nor is my invention limited, in its softening agents, to liquids of any sort, whether solvents or not, but includes also the use of heat where the adhesives employed on or within either the fabric or the joining tape are of a thermoplastic variety. Where all three adhesives presented are either of the same or of different chemical compositions but are all thermoplastic, heat is the agent which I employ to cause the several adhesives to combine. On the other hand, if one or more of the adhesives be thermoplastic and one or more of the other adhesives be solvent plastic, I employ solvents which produce adhesive solutions or dispersions which combine, chemically or otherwise, with the heat-softened thermoplastic adhesives.

The invention and novel features thereof will best be understood from the following description and accompanying drawing showing the two woven fabric strips A and B with dissimilar back coating adhesives, joined by a strip of adhesive 8.

In the drawing, the two woven fabric strips may be of any conventional weave, but as shown they comprise the stuffer warps 1 and the binding warps 2 which pass about the upper and lower weft shots 3 and 4, respectively. As shown, the woven fabric strips are provided with a pile tread surface 5, and one of the woven fabric strips A, for instance, is provided with a back coating 6 of rubber, while the adjoining woven fabric strip B has a back coating 7 of pyroxylin or the like.

The adhesive tape 8 which is employed to join the fabric strips A and B may be of any suitable adhesive composition, either of the same chemical composition as that of one of the strips A or B, or different from both of the adhesives employed on the strips A and B. In the embodiment shown herein the adhesive tape 8 comprises a film of pyroxylin and is secured along the abutting edges of the strips A and B, represented on the line a b, overlapping the adhesive backings of the woven fabric strips A and B.

In applying the adhesive tape 8 to the fabric strips A and B, I preferably employ a liquid which is solvent both of the adhesive on the back of the fabric strips A and B and also of the adhesive constituting the tape 8.

In effecting such a seam, I may first treat the adhesive on the back of the fabric strips A and B with the solvent and then place the cementitious tape 8, to which also has been applied the same solvent, over the abutting edges of the fabric strips A and B. Upon evaporation of the solvent all of the adhesives will be firmly bonded together.

While I may proceed in this manner I preferably obviate the separate treatment of the dissimilar adhesives by applying a substantial amount of the common solvent to the adhesive tape 8 only, the solvent on the tape flowing on to the adhesive on the fabric strips after the tape has been superimposed thereon, and I have found that by this method all of the adhesives may be effectively softened and bonded together.

In some instances, as for example when the adhesive on a fabric strip is not applied as a coating on the back but is woven into the fabric in the form of a soluble thread which is rendered plastic and allowed to harden in the manner described below prior to cutting the fabric into strips, I thoroughly moisten the tape and fabric with a solvent which not only softens the tape but which also again softens the adhesive produced from the soluble thread. In this manner all of the adhesives are dissolved or rendered plastic by a single solvent and are caused to flow together and intermix, whereby, upon evaporation of the solvent, a hardened and substantial bonding medium is provided, not only on the back exposed surface of the fabric strips A and B adjacent the abutting edges, but also internally of the rug structure and through the abutting edge portions.

The adhesives which are commonly employed on the backing fabric of strips to be joined together are of various compositions, chiefly reclaimed rubber, vulcanized latex, compounded latex, chlorinated rubber or pyroxylin. Adhesives which are commonly employed as tapes to join together the abutting edges of fabric strips having one or more of the adhesives above mentioned, may be pyroxylin cement, chlorinated rubber or latex. Solvents which have a double or triple softening action on any combination of the above adhesives may be classified as alcohols, ketones, esters, ethers and hydrocarbons and their derivatives, and as examples of double or triple solvents of this character may be mentioned benzene, cyclo-hexanone, ether, carbon tetrachloride, turpentine, gasoline, ethyl acetate, ethylene dichloride, chloroform, toluol, carbon disulphide and acetone.

As hereinbefore mentioned, the adhesive which has been applied to the fabric strip A or B to be joined, instead of being applied to the back of the fabric strip after weaving may have been incorporated into the fabric during the weaving by employing a soluble thread which, after weaving, may be treated with a suitable solvent to produce an adhesive which flows internally of the fabric structure and onto the back surface thereof. Such a thread may suitably be composed in whole or in part of cellulose acetate, which, after weaving, may be rendered plastic by treatment with a mixture of 95% ethylene dichloride and 5% ethyl alcohol or any other similar solvent. This same liquid may later be employed as a double or triple solvent to join together, with a tape having a pyroxylin cement or latex adhesive, the abutting edges of two fabric strips, one of which has either been woven with cellulose acetate threads and thereafter treated with the said liquid prior to being cut into strips, or which has a coating of reclaimed rubber, vulcanized latex, compounded latex, chlorinated rubber or pyroxylin and the other of which has the same or a different one of the foregoing adhesives.

Also the adhesive of the joining tape itself may be provided in the form of a soluble thread woven into the tape. Such a thread may suitably comprise cellulose acetate which is soluble in the aforementioned mixture of 95% ethylene dichloride and 5% ethyl alcohol and this mixture may constitute a double or triple solvent to join a soluble thread tape of this character to a pair of rug strips which are coated with reclaimed rubber, vulcanized latex, compounded latex, chlorinated rubber or pyroxylin or which were woven with a soluble cellulose acetate thread and subsequently treated or which provide any combination of the foregoing adhesives.

In certain other instances the softening agent which is common to a plurality of adhesives, may comprise heat rather than a solvent. Thus the adhesive which is incorporated into the fabric strip to be joined may be in the form of a thread which is thermoplastic and is composed of or coated with what I shall term a "tornesit" compound comprising a mixture of 40% solids comprising 15 parts of chlorinated rubber, 10 parts resin and 10 parts dibutyl phthalate, or other similar substances. The adhesive tape may comprise thermo-plastic cellulose ethers, and the fabric strips to be joined and the adhesive tape employed to join them may simultaneously be rendered viscid and become bonded by a single application of heat.

While I have enumerated certain cements, adhesives and solvents in illustrating the processes of my invention, it will be understood that I do not wish to limit myself thereto but that the methods of my invention may be practiced with other materials than those specifically set forth.

I claim:

1. The method of uniting the abutting edges of two pieces of pile fabric floor covering, one of which has its back coated with rubber and the other of which has its back coated with pyroxylin, which consists in assembling the two pieces with their edges in abutting relation and applying over the abutting edges of the two pieces a pyroxylin composition carrying a plasticizing agent common to the pyroxylin and the said rubber coating.

2. The method of uniting, by a cementitious tape, the abutting edges of two pieces of pile fabric floor covering, in which the said pieces of fabric and cementitious tape present rubber and pyroxylin surfaces to be united, which comprises assembling the two pieces of fabric with their edges to be joined in abutting relation, applying the said cementitious tape over the said abutting edges of the fabric pieces and causing the rubber and pyroxylin to unite by the application thereto of a common plasticizing agent.

3. The method of uniting, with a cementitious tape, the abutting edges of pieces of pile fabric floor covering, which consists in assembling, with their edges to be joined in abutting relation, two pieces of fabric, the backing of one of which carries an adhesive chosen from the group consisting of reclaimed rubber, vulcanized latex, compounded latex and chlorinated rubber, and the backing of the other of which carries an adhesive chosen from the group consisting of pyroxylin and plasticizable cellulose acetate, applying over the abutting edges of the fabric pieces, a cementitious tape carrying an adhesive chosen from one of said groups, and uniting the said adhesives and cementitious tape by the application thereto of a solvent for the adhesives on the tape and on both pieces of fabric.

4. The method of uniting pieces of pile fabric floor covering which consists in placing in edgewise abutment with each other the cut edges of two pieces of fabric, one of which has been woven with threads carrying cellulose acetate strands that have been plasticized before cutting, and the other of which carries on its backing an adhesive chosen from the group consisting of reclaimed rubber, vulcanized latex, compounded latex and chlorinated rubber, applying to the abutting edges a tape carrying a cementitious material chosen from the group consisting of reclaimed rubber, vulcanized latex, compounded latex, chlorinated rubber and cellulose acetate and causing the said adhesives and the cementitious tape to unite by applying to the adhesives a solvent composed chiefly of ethylene dichloride.

ARA T. DILDILIAN.